United States Patent [19]
Lehmann et al.

[11] 3,943,322
[45] Mar. 9, 1976

[54] WIRE ELECTRO-EROSION MACHINING APPARATUS

[75] Inventors: Hans Lehmann; Roger Girardin; William Morf; Roger Delpretti, all of Geneva, Switzerland

[73] Assignee: Ateliers des Charmilles, S.A., Geneva, Switzerland

[22] Filed: July 26, 1974

[21] Appl. No.: 492,254

[30] Foreign Application Priority Data
Aug. 6, 1973   Switzerland...................... 11344/73

[52] U.S. Cl............................. 219/69 E; 219/69 V
[51] Int. Cl.² ............................................ B23P 1/08
[58] Field of Search . 219/69 V, 69 E, 69 R, 125 PL

[56] References Cited
UNITED STATES PATENTS

| | | |
|---|---|---|
| 3,671,705 | 6/1972 | Raznitsyn.......................... 219/69 V |
| 3,731,045 | 5/1973 | Ullmann et al. .................. 219/69 V |
| 3,830,996 | 8/1974 | Ullmann et al. .................. 219/69 V |
| 3,849,624 | 11/1974 | Dulebohn .......................... 219/69 X |

Primary Examiner—Bruce A. Reynolds
Attorney, Agent, or Firm—Hauke, Patalidis & Dumont

[57]  ABSTRACT

Support and guiding means for a wire electrode in an electro-erosion machining apparatus comprising a V-block support and guide having two angularly disposed guiding surfaces substantially parallel to the wire electrode longitudinal axis mounted on a base automatically orientable radially about the wire longitudinal axis such that the axis of a linear cut through the workpiece or, alternatively, the tangent of a curvilinear cut substantially bisects the angle formed by the two angularly disposed guiding surfaces.

7 Claims, 6 Drawing Figures

WIRE ELECTRO-EROSION MACHINING APPARATUS

BACKGROUND OF THE INVENTION

The present invention relates to an arrangement for the support and guiding means of a wire electrode used for effecting a cut by electro-erosion in a workpiece.

In electro-erosion apparatus provided with a wire electrode, the electrical discharges occur between an electrode workpiece and the wire electrode fed into the machining zone between a pair of electrode guiding and support means, the workpiece and the wire electrode being displaced relatively to each other about two axes, for example, by means of numerically controlled servo motors. The inputs to the servo motors are obtained from an appropriate program providing a pre-established machining path.

The accuracy of machining of a wire electrode electro-erosion apparatus is greatly dependent upon the electrode wire support and guiding means. It is particularly difficult to feed a wire electrode beyond its support and guiding means in a perfectly rectilinear path. Errors in the precision with which the wire electrode is supported and guided are due to many causes of a mechanical nature, and more particularly are due to variations in the load applied to the wire when the wire holders are subjected to a change in trajectory, and to variations in friction between the wire and the surfaces in engagement with the wire, with the result that unequal frictions exerted by the guiding surfaces on the wire create a torque causing a lateral displacment of the wire being fed beyond the guiding surfaces. Diameter variations of the wire while being fed through the workpiece, combined with the roughness or the wear of the wire surface in the machining zone may also cause errors between the actual positioning of the wire at a given moment and the desired positioning according to its programmed path.

It is known to support and guide a wire electrode by holding its peripheral surface engaged with a pair of reference flat surfaces disposed at a predetermined angle relative one to the other. However, such an arrangement does not permit to completely eliminate positioning errors, especially in structures in which the element urging the wire in engagement with the reference surfaces in addition acts as a contact for supplying electrical current to the wire electrode. The coefficient of friction of this element, made of a current conductive metal, is different from the coefficient of friction of the reference surfaces of the wire electrode guides which are generally made of sapphire.

In the event of variations in the diameter of the wire, such an arrangement causes an error in the position of the active surface of the electrode, and such error is substantially larger along the bisector plane of the two wire guide surfaces than in a plane perpendicular to either surface. If, for example, the guide reference surfaces are disposed at a relative angle of 60°, the error in position of the wire in the bisector plane is three times what is would be in a plane perpendicular to either surface. It is therefore readily apparent that the diverse errors affecting the precision of guiding of the wire electrode, whether considered singly or in combination, are produced in a direction which is dependent upon the geometry of the wire electrode guiding means. Consequently, the importance of the errors affecting the machined surface of the workpiece is a function of the orientation of the electrode holder and guide relative to the machining path.

Heretofore, the prior art system for controlling the relative position of a workpiece and of a wire electrode do not take into consideration the orientation of the wire holder and guide relative to the machining path, and the reference surfaces guiding the wire are indifferently positioned relative to the machining path. The disadvantages and inconvenience of the prior art arrangements are remedied by the present invention whose principal object is to provide means for greatly improving the machining accuracy as a result of providing a wire electrode holder and guide arranged such that the most important positioning errors of the wire take place in a predetermined direction relative to the machining path, such that they have no influence upon the quality and accuracy of the machined surface.

SUMMARY OF THE INVENTION

The present invention accomplishes its principal object by providing a wire electrode guide which is automatically oriented such that the electrode positioning errors are directed along a tangent to the machining path. The invention accomplishes such a result by providing means for angularly orienting the wire electrode holder and guide in the course of successive changes of relative position between the wire electrode and the workpiece, as a function of the programmed variations in the machining path, such that the points of engagement of the wire electrode with the reference surfaces of the guide are outside of the surface portion of the wire electrode subjected to electrical discharges.

BRIEF DESCRIPTION OF THE DRAWINGS

In the accompanying drawing, representing in a schematic manner for illustration purposes examples of combination of elements according to the present invention and wherein like reference numerals relate to like or equivalent parts.

DETAILED DESCRIPTION OF THE PREFERRED EMBODIMENTS

Figure 1:
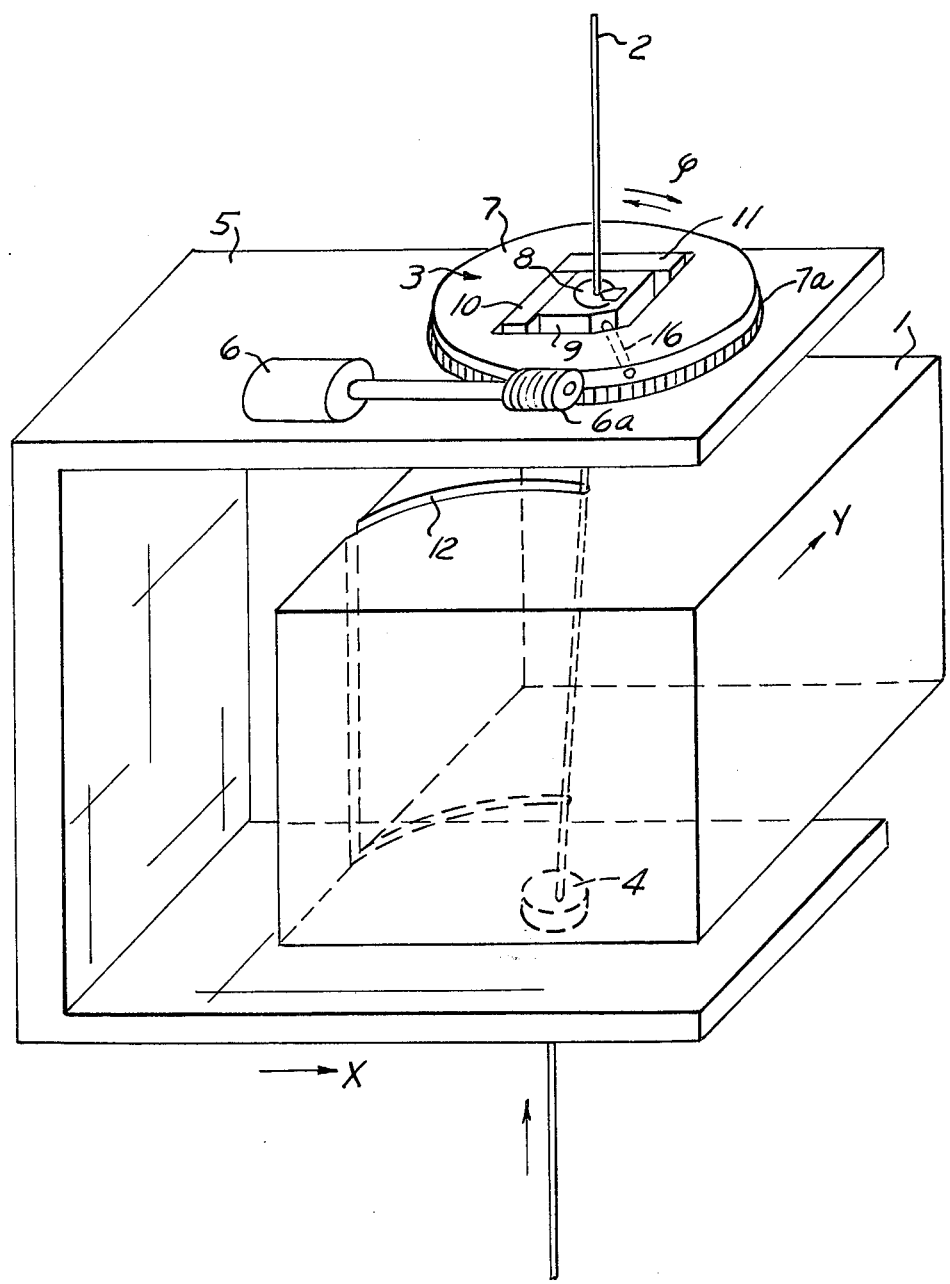
FIG. 1 is a perspective view of an arrangement for supporting and guiding a wire electrode, according to the present invention.

Referring now to FIG. 1, a workpiece 1 is shown in the course of being machined by electro-erosion by means of an electrode-tool consisting of a metallic wire 2. The electrical power generator connected across the workpiece 1 and the wire electrode 2, and the arrangement for providing an appropriate fluid to the machining zone are not shown, for the sake of simplifying the disclosure and as they are devices well known to those skilled in the art of electro-erosion machining.

The wire 2 is stretched between a pair of support and guiding means designated respectively by numerals 3 and 4, mounted in, respectively, the upper and the lower portion of a stirrup, or U-shaped, support member 5. The workpiece 1 is disposed between the upper and lower portion of the support member 5, and appropriate means, not shown, controllably displace the wire 2 and the workpiece 1 relative to each other, such as to form a cut of an appropriate contour or path through the workpiece 1, as shown at 12. It is convenient to control the relative displacement of the wire electrode and of the workpiece by means of a numerical control system according to a program providing a predetermined machining path 12. It is clear to those skilled in the art that the resultant machining path is obtained either by displacing the workpiece 1 relative to octagonal axes of displacement, X and Y, relative to the wire 2 which is held stationary, or, alternatively, by displacing the wire 2 along the two coordinate axes relative to the workpiece 1 which is held stationary, or yet by displacing the wire 2 along one of the coordinate axes and the workpiece 1 along the other coordinate axis as, for example, illustrated in the drawing, by way of servo stepping motors 22 and 23.

Figure 2:
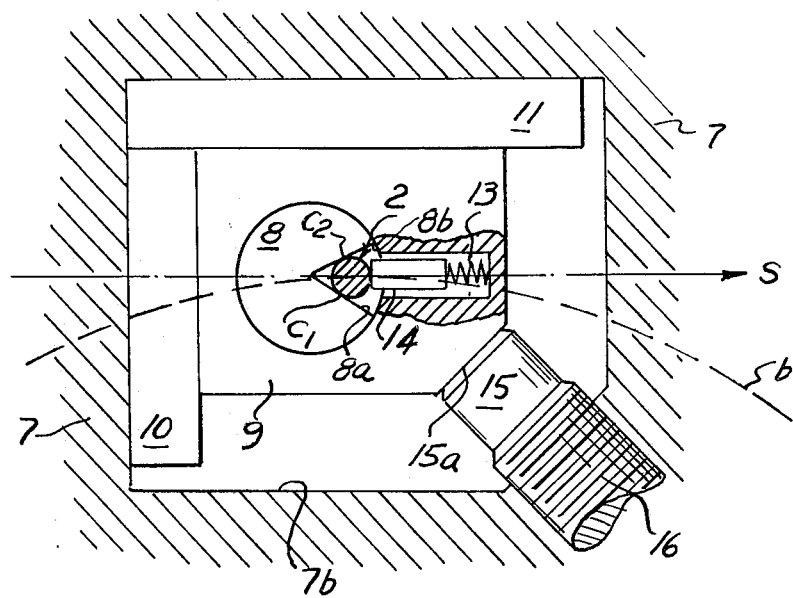
FIG. 2 is an enlarged plan fragmentary view of the wire electrode holder and guide arrangement of FIG. 1.

The wire guide 3 comprises a rotatable table 7 provided with a peripherally toothed ring 7a such as to be rotatably angularly positionable by a servo motor 6 driving a worm 6a meshing with the toothed ring 7a. A guide member 8 for the wire 2 is mounted in an aperture 7b in the table 7. The guide member 8 is substantially in the form of a V-block presenting a pair of angularly disposed sidewalls defining appropriate bearing and guiding surfaces for the wire 2, as best shown at FIG. 2 at 8a and 8b respectively. The guide member 8 is mounted in a holding block 9 which is supported in the aperture 7b in the table 7, appropriate shim blocks 10 and 11 being disposed between two consecutive side faces of the mounting block 9 and the corresponding sidewalls of the aperture 7b. The thickness of the shim blocks 10 and 11 is chosen so as to cause the wire 2 to be inclined of a predetermined amount relative to the workpiece 1.

As also best shown at FIG. 2, the wire 2 is held engaged with the surfaces 8a and 8b of the guiding member 8, at the bottom of the V-slot formed by the guiding surfaces, by means of a push-rod 14 urged by a coil spring 13. The push-rod may conveniently be used for supplying electrical current to the wire electrode.

The guide block member 9 is held in the aperture 7b of the table 7 by means of a set screw 16 having an unthreaded end 15 with a flat end face engaging a flat corner surface 15a of the guide block 9, and pressing the sides of the block 9 against the shim blocks 10 and 11.

The points of engagement of the wire 2 with the guiding surfaces 8a and 8b of the guide member 8 are designated $C_1$ and $C_2$, respectively, at FIG. 2. In the course of an electro-erosion machining operation, the wire 2 is longitudinally fed by means not shown, and this longitudinal displacement of the wire 2 between the wire support and guiding means 3 and 4, in the direction of the arrow of FIG. 1, causes frictional forces to be exerted on the wire at its points of engagement $C_1$ and $C_2$ with the guide surfaces 8a and 8b of the guide member 8 and with the end face of the push-rod 14. Because the guide surfaces 8a and 8b and the push-rod 14 are made of different materials, having different coefficients of friction, there results unequal forces applied to the wire that may cause the wire to be slightly deflected. However, the deflection of the wire 2 from a straight line, which as known in the art of numerical control is very small, and is directed in the direction shown by arrow S at FIG. 2, has practically no effect on the accuracy of the machined surfaces as long as the guide member 8 is oriented such as to cause the points $C_1$ and $C_2$ of engagement of the wire 2 with the guide surfaces to fall on a portion of the wire 2 which is not subjected to electro-erosion wear. The feed of the wire being effected from the guiding means 4 towards the guiding means 3, and as only the leading peripheral portion of the wire is subjected to wear, the points of contact $C_1$ and $C_2$ between the wire and the cutting surfaces are located at the trailing peripheral portion of the wire which is not affected by electro-erosion wear.

The lateral displacement of the wire 2 relative to the workpiece 1 is effected along the arrow S, the machining path being represented by the path b. As long as the bisector of the angle formed by the guiding surfaces 8a and 8b falls on a tangent S to the path b, the points $C_1$ and $C_2$ of engagement of the peripheral surface of the wire 2 with the guiding surfaces 8a and 8b occur at surface areas of the wire which have not been subjected to electro-erosion wear. Consequently the wire 2 is subjected to wear on its surface areas which are not in contact with the guiding surfaces 8a and 8b, and the wear of the wire has no deleterious influence upon the accuracy of guiding of the wire.

Figure 3:
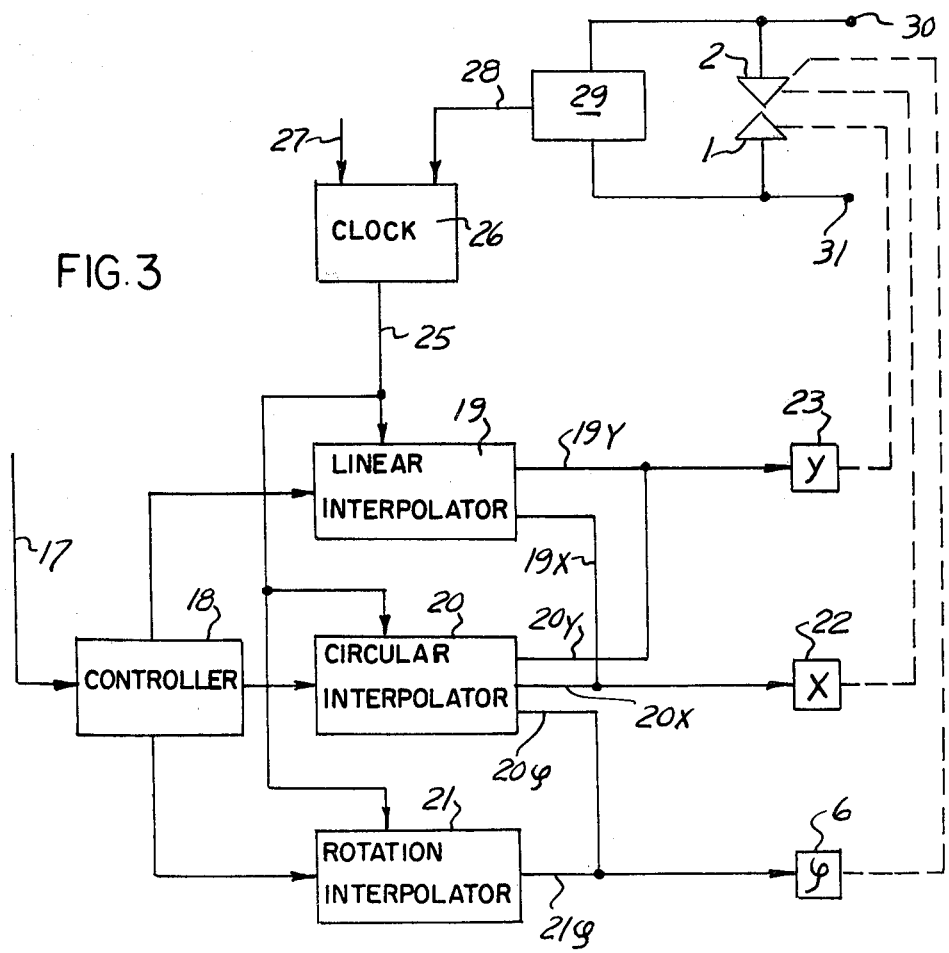
FIG. 3 is a circuit block diagram for controlling the angular position of the wire electrode holder and guide of FIGS. 1 and 2.

FIG. 3 schematically illustrates an electrical circuit for controlling the rotation of the rotatable table 8. In arrangements wherein numerical control provides command signals for the step-by-step relative motion of the wire electrode and of the workpiece, the program information defining the desired machining path is supplied by a line 17 to a controller 18 which in turn supplies instructions to three interpolators, a linear interpolator 19, a circular interpolator 20 and a rotation interpolator 21. The linear interpolator 19 supplies by means of a line 19x pulses to a stepping motor 22 causing the linear displacement of the workpiece, relative to the wire electrode, along the X-axis, and by means of a line 19y to a stepping motor 23 effecting the linear displacement of the workpiece along the Y-axis. The circular interpolator 20 supplies pulses to both X-axis stepping motor 22 and Y-axis stepping motor 23 by means of lines 20x and 20Y respectively, so as to cause nonlinear displacement of the workpiece simultaneously about the X- and Y-axes relative to the wire electrode. The circular interpolator 20 and the rotation interpolator 21 supply at their outputs pulses to the servo motor 6, by means of respectively lines $20\phi$ and $21\phi$, for rotating the rotatable table 7 (FIG. 1). The three interpolators 19–21 are controlled by clock pulses supplied by a line 25 from a pulse generator 26. The frequency of the pulse generator 26 may be manually adjusted, as symbolically represented at its input 27, or automatically, as a function of the conditions, such as voltage or current for example, at the machining zone between the workpiece 1 and the wire electrode 2, by way of an appropriate control signal supplied by a line 28 from a detection means 29 of the conditions at the machining zone. The voltage-current pulses applied across the machining zone between the electrode-tool 2 and the workpiece 1 are supplied to the terminal inputs 30 and 31 by a power generator, not shown.

Figure 4:
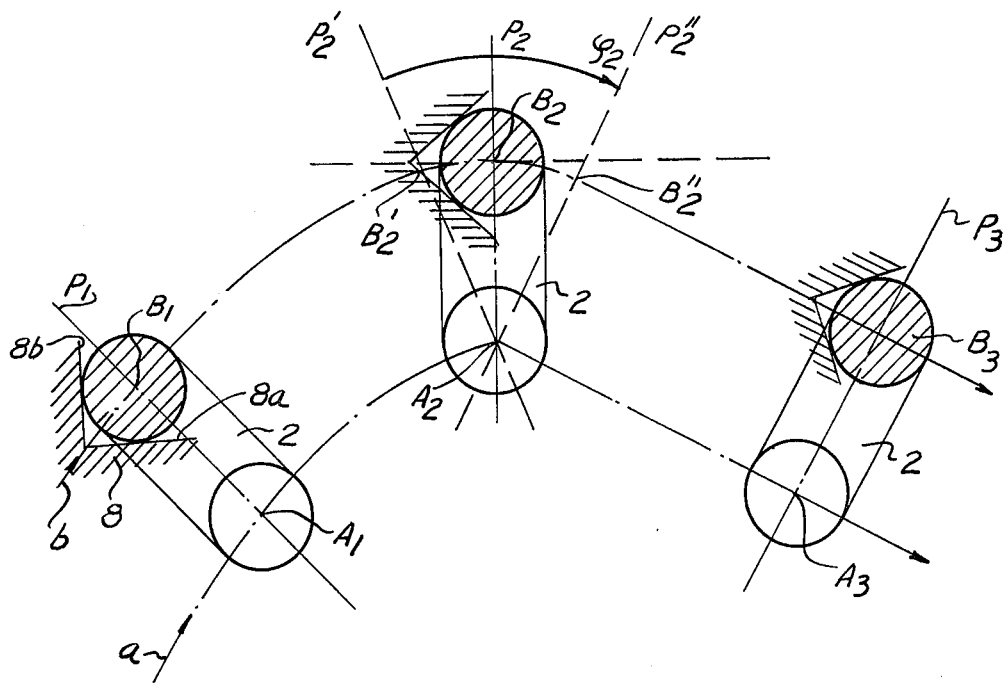
FIG. 4 is a schematic illustration of the relative positioning of the wire electrode and wire electrode holder and guide relative to a machining path.

FIG. 4 schematically illustrates successive angular positioning of the wire electrode guiding means in an arrangement wherein the wire electrode is inclined relative to the reference plane of linear displacement. The lower guiding means follows the programmed path shown in phantom line at $a$ of the center A ($A_1$, $A_2$, $A_3$) of the wire electrode 2, taking into consideration the width of the wire and the machining gap. The inclination of the wire is represented by the amount of offset $A_1$–$B_1$ of the axis of the wire stretched between the two guiding means, lower and upper, as projected upon an arbitrarily chosen horizontal plane. The path of the center of the wire as guided by the upper guiding means is represented by phantom line $b$.

The beginning of the paths $a$ and $b$ are shown as being curvilinear, and the upper guide 8, represented by its guiding surfaces $8a$ and $8b$, is subjected to a progressive rotation such that a plane $P_1$ passing through the axis $A_1$–$B_1$ of the wire 2 and the axis of rotation of the wire guide 8 remains perpendicular to the path $a$ of the lower guiding means and to the path $b$ of the upper guiding means. The only requirement to effectuate such results is that the guiding surfaces $8a$ and $8b$ of the guide 8 be disposed, at the start of the operation, in a correct orientation relative to the plane $P_1$, and the correct orientation is automatically maintained in the course of the machining operation under control of the circular interpolator 20 and of the rotation interpolator 21 of FIG. 3 providing appropriate command signals to the servo motor 6 (FIG. 1) rotating the table 7 in an appropriate direction and of an appropriate amount as a function of the instructions operating the numerical control of the machine. At point $A_2$, the path $a$ abruptly changes direction. The displacement of the wire electrode relative to the workpiece is momentarily interrupted until the upper wire guide 8 has been rotated of an angle $\phi_2$ permitting to displace the plane $P_2$ from a position $P'_2$ perpendicular to paths $B_1$–$B'_2$ and $A_1$–$A_2$ to a position $P''_2$ perpendicular to the paths $B''_2$–$B_3$ and $A_2$–$A_3$. The remainder of the paths $b$ and $a$ is shown as rectilinear, such that no further change in the angular orientation of the wire guide 8 is required in the course of the progression of the wire centers from the position $B''_2$–$A_2$ to $B_3$–$A_3$, with the plane $P_2$ achieving its position $P_3$.

Figure 5:
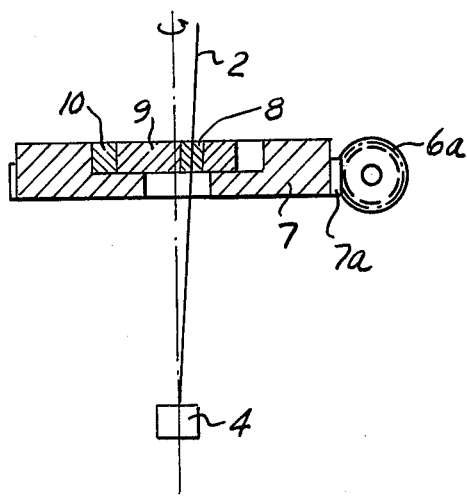
FIG. 5 is a sectional view of a portion of the arrangement illustrated at FIG. 1.

For the purpose of improving the accuracy of the machining path, it is desirable that the portion of the wire 2 disposed between the upper and lower guiding means 3 and 4 be as straight as possible. To that effect, and as shown at FIG. 5, the guide member 8 is preferably axially inclined toward the axis of rotation of the table 7, such that the wire 2 remains constantly axially inclined in the same direction between the guiding means 4 and 3 and while in engagement with the guiding surfaces of the guide 8, without bending. The inclination of the guide 8 relative to the table 8 may be obtained by mounting the guide 8 in an appropriate aperture in the support member 9 having an axis at an angle other than the perpendicular to the plane of the table 7.

Figure 6:
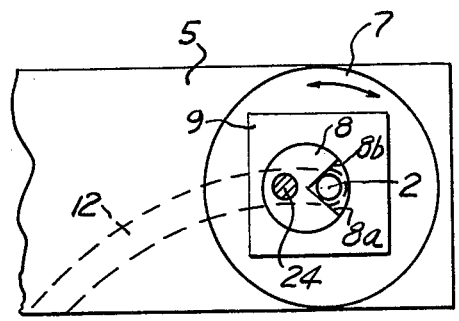
FIG. 6 is a modification of the arrangement illustrated at FIGS. 1 and 2.

FIG. 6 illustrates an example of a simple mechanical arrangement for orienting by rotation the table 7 and consequently the relative position of the lateral guiding surfaces $8a$ and $8b$ of the guide 8. The table 7 is held rotatively in the upper plate member of the U-shaped support 5, or, alternatively, the table 7 is stationary and the guide 8 is rotatable relative to its holder 9. The guide 8, is provided with a downwardly projecting feeler 24, made of a nonconductive material or alternatively, if made of metal, electrically insulated from the wire 2, and normally projecting into the cut 12 in the workpiece. The feeler 24 is substantially of the same width as the cut 12, and by engaging either one or the other of the sidewalls of the cut 12 automatically maintains the guide 8 in an appropriate angular position, causing the bisector of the angle formed by the guide surfaces $8a$ and $8b$ to be substantially along a tangent to the machining path. The arrangement of FIG. 6 is particularly desirable when the electro-erosion apparatus is not provided with numerical control, or another programmed control of the machining path. In such an arrangement, the machining path may be determined by way of a cam profile controlling the relative displacement of the workpiece and wire electrode.

Although the present invention has been described as providing automatically orientable common support means for a wire electrode upper support and guiding means, it will be appreciated that a similar arrangement may be, and generally is, provided at the lower support and guiding means.

It will be understood that the present invention is not to be limited to the details of the embodiments disclosed herein, which have been presented by way of example only and for the purpose of providing a useful and readily understood description of the principles of the invention.

What is claimed as new is:

1. In an electro-erosion machining apparatus comprising a wire electrode stretched and axially translated between a pair of spaced apart wire guiding means and means for displacing the portion of said wire stretched between said guiding means relative to a workpiece to effectuate a cut through said workpiece according to a programmed path, the improvement for at least one of said guiding means comprising a pair of angularly disposed guide surfaces substantially parallel to the longitudinal axis of said wire electrode, means urging said wire electrode in engagement with said guide surfaces, support means for said guide surfaces, and means for rotating said support means about an axis substantially corresponding to the longitudinal axis of said wire electrode as a function of the direction of said path such that the areas of the wire electrode in engagement with said guide surfaces correspond to areas of the wire electrode which are not affected by electro-erosion wear.

2. The improvement of claim 1 wherein the bisector of the angle formed by said angularly disposed guide surfaces is along a tangent to said programmed machining path.

3. The improvement of claim 1 further comprising numerical control means for controlling the relative displacement of the wire electrode and of the workpiece according to said programmed machining path, and wherein said means for rotating said support means comprises a rotatable table supporting said support means for said guide surfaces, a servo motor for rotating said table, a circular interpolator for stepping said servo motor for properly orienting said table as a result of instructions being supplied to said numerical control for effecting a curvilinear machining path, and a rotation interpolator for further stepping said servo motor for rotating said table when said machining path is subject to an abrupt change of direction.

4. The improvement of claim 3 wherein said electrode wire is held by said guiding means at an angle relative to the axis of rotation of said table.

5. The improvement of claim 1 wherein said guiding surfaces are constantly substantially parallel to the longitudinal axis of said wire electrode stretched between said spaced apart guiding means.

6. The improvement of claim 3 wherein said guide surfaces are constantly substantially parallel to the longitudinal axis of said wire electrode stretched between said spaced apart guiding means.

7. The improvement of claim 1 wherein said means for rotating said support means comprises an electrically insulated feeler eccentrically mounted on said support means relative to the axis of rotation of said support means and projecting in the cut effected by said wire electrode in said workpiece.

\* \* \* \* \*